United States Patent [19]

Hofer

[11] Patent Number: 5,026,250
[45] Date of Patent: Jun. 25, 1991

[54] APPARATUS FOR SINGULARIZING STACKED PORTIONS OF BOOKS AND THE LIKE

[75] Inventor: Peter Hofer, Wigoltingen, Switzerland

[73] Assignee: GRAPHA-Holding AG, Hergiswil, Switzerland

[21] Appl. No.: 462,810

[22] Filed: Jan. 10, 1990

[30] Foreign Application Priority Data

Feb. 27, 1989 [CH] Switzerland ............ 715/89

[51] Int. Cl.$^5$ .............................. B65G 59/06
[52] U.S. Cl. .................. 414/796.1; 414/797.4; 414/797.6; 271/35
[58] Field of Search ............ 414/795.8, 795.9, 796, 414/796.1, 797.4, 797.6, 797.9, 900; 271/10, 34, 35, 121

[56] References Cited

U.S. PATENT DOCUMENTS

| | | | |
|---|---|---|---|
| 3,622,149 | 11/1971 | Enskat | 271/35 |
| 4,000,821 | 1/1977 | Naito et al. | 414/797.6 |
| 4,192,496 | 3/1980 | Baselice et al. | 414/797.6 X |
| 4,202,232 | 5/1980 | Müller | 83/519 |
| 4,369,961 | 1/1983 | Gopel et al. | 271/35 X |
| 4,805,376 | 2/1989 | Oberdorf | 414/797.6 X |
| 4,867,433 | 9/1989 | Wells et al. | 271/35 |

FOREIGN PATENT DOCUMENTS

| | | | |
|---|---|---|---|
| 521625 | 3/1931 | Fed. Rep. of Germany | 271/35 |
| 49764 | 4/1979 | Japan | 271/35 |
| 645294 | 9/1984 | Switzerland . | |

*Primary Examiner*—Robert J. Spar
*Assistant Examiner*—Craig Slavin
*Attorney, Agent, or Firm*—Peter K. Kontler

[57] ABSTRACT

Apparatus for singularizing successive stacks of a series of stacks consisting of superimposed groups of sheets has a transporting unit which advances successive stacks of the series in a horizontal plane against a barrier which intercepts each but the lowermost group of the oncoming stack. An endless conveyor with one or more pushers is provided to advance successive lowermost groups of an intercepted stack through and beyond a clearance between the barrier and a stationary table of the transporting unit. The width of such clearance exceeds the height of a single group but is less than the combined height of two superimposed groups. The width of the clearance and the extent to which the pusher or pushers can extend above the horizontal plane are adjustable. The apparatus further comprises a gate which is pivotable behind an intercepted stack to a position in which it prevents advancement of a fresh stack toward the table and can bias each but the lowermost group of an intercepted stack against the barrier, and a raised position in which the conveyor of the transporting unit is free to deliver a fresh stack toward and into engagement with the barrier. The barrier is adjustable toward and away from the gate.

19 Claims, 1 Drawing Sheet

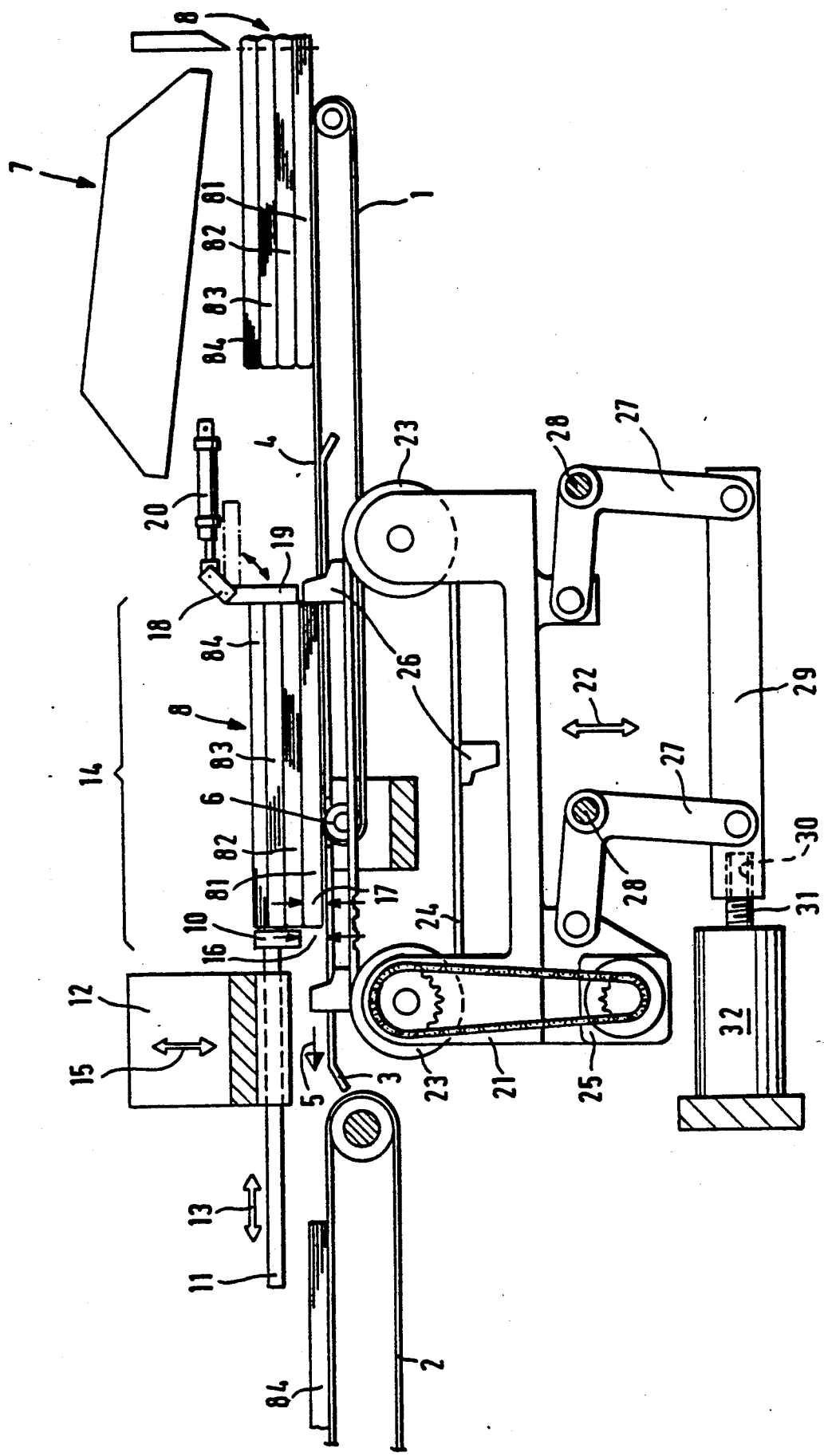

APPARATUS FOR SINGULARIZING STACKED PORTIONS OF BOOKS AND THE LIKE

BACKGROUND OF THE INVENTION

The invention relates to improvements in apparatus for manipulating sheets, especially groups of sheets which constitute portions of books, brochures or the like. More particularly, the invention relates to improvements in apparatus for singularizing successive stacks of superimposed groups of sheets in a bookbinding or other plant.

Swiss Pat. No. 645 294 discloses a machine which serves to simultaneously trim two or more edge faces of a stack of sheets, e.g., one or more signatures, brochures or the like. The output of such trimming machine (e.g., the number of cycles per unit of time) is a relatively small fraction of the output of a perfect binder which is often located ahead of the trimming machine. Therefore, it is customary to accumulate the groups of sheets issuing from a perfect binder into stacks of superimposed groups and to simultaneously trim successive stacks to thus compensate for the difference between the output of the perfect binder and the output of the trimming machine. The height of each stack is selected with a view to ensure that the trimming machine will be capable of properly trimming two or three sides of the entire stack of superimposed groups of sheets. Another factor which determines the height of successive stacks is the difference between the output of the machine which turns out the groups (such as the aforementioned perfect binder) and the output of the trimming machine.

Once the trimming operation is completed, the stacks of superimposed groups of sheets must be broken up (i.e., singularized) for further processing, e.g., for gathering into packages containing selected numbers of trimmed groups preparatory to storage, shipment to customers or distributors or to another destination. For example, magazines, advertising brochures and like groups of sheets must be provided with names and addresses of recipients and the properly addressed groups are thereupon assembled into packages for shipment or mailing to selected post offices or directly to subscribers.

OBJECTS OF THE INVENTION

An object of the invention is to provide a novel and improved singularizing apparatus for successive stacks of a series of stacks of superimposed groups of sheets, e.g., for successive stacks of freshly trimmed groups of sheets leaving a trimming machine.

Another object of the invention is to provide a singularizing machine which can break up successive stacks of superimposed groups of sheets or analogous commodities at the frequency at which such products are turned out by a perfect binder or an analogous group forming machine.

A further object of the invention is to provide a versatile singularizing apparatus which can be readily and rapidly converted for the singularization of thicker or thinner as well as longer or shorter groups of sheets and which can break up tall, medium tall or short stacks with the same degree of reliability.

An additional object of the invention is to provide an apparatus which can singularize stacked groups of sheets in synchronism with the operation of the machine which delivers stacks as well as with the operation of the machine or machines which receive singularized groups.

Still another object of the invention is to provide the apparatus with novel and improved means for properly orienting the stacks in the course of the singularizing operation, with novel and improved means for delivering stacked groups of sheets to the singularizing station, and with novel and improved means for preventing simultaneous removal of two or more groups from the singularizing station.

A further object of the invention is to provide a simple, compact and inexpensive apparatus which can be used in conjunction with existing trimming machines and/or in conjunction with existing machines which must receive a single file of discrete groups of sheets.

Another object of the invention is to provide the apparatus with novel and improved means for preventing untimely delivery of stacks of superimposed groups of sheets to the singularizing station.

SUMMARY OF THE INVENTION

The invention is embodied in an apparatus for singularizing a series of stacks of superimposed groups of sheets, such as inner books (e.g., one or more signatures), wherein each group has a predetermined height. The improved apparatus comprises means for transporting successive stacks of the series above a predetermined plane in a predetermined direction along a first path, a barrier (e.g., an elongated rail) extending transversely of the first path above the predetermined plane and defining with the plane a clearance having a width of not less than n and not more (and preferably less) than 2n (wherein n is the height of a group) so that the barrier intercepts each but the lowermost group of an oncoming stack, and means for advancing successive lowermost groups of a thus intercepted stack. The advancing means comprises at least one pusher and means for moving the pusher along a second path including a top portion wherein the pusher extends above the plane a distance at most equaling n and advances toward the clearance from a position behind an intercepted stack.

The second path preferably further includes a second portion along which the at least one pusher advances toward the aforementioned position and is located at a level beneath the predetermined plane. The top portion of the second path can extend in the predetermined direction beyond the clearance beneath the barrier, i.e., the at least one pusher can advance successive lowermost groups of an intercepted stack beyond the clearance to ensure that the remnant of the intercepted stack can descend behind the clearance to be engaged and advanced by the at least one pusher when the latter returns to and begins to advance beyond the aforementioned position.

The apparatus preferably further comprises a gate (e.g., a pivotable flap) which extends substantially transversely of the first path and is movable by a fluid-operated motor or by other suitable moving means between a first position (in which the gate is located in the first path behind an intercepted stack) and a second position outside of the first path. This enables the transporting means to deliver the next stack of the series as soon as the gate is moved to the second position. When it assumes the first position, the gate is located at a level above the top portion of the second path so that it cannot interfere with movements of the at least one pusher to and forwardly beyond its aforementioned position. The means for moving the gate can include means (such as the aforementioned motor) for urging the gate against each but the lowermost group of an intercepted stack in the first position of the gate so that the gate maintains the front edge face of each but the lowermost group of an intercepted stack in abutment with or at least close to the barrier.

The means for moving the at least one pusher can comprise an endless conveyor (e.g., a belt or chain conveyor) having an upper reach which is substantially parallel to the predetermined plane and defines the top portion of the second path, and a lower reach which defines the second portion of the second path at a level beneath the predetermined plane for advancement of the at least one pusher back to its aforementioned position behind the lowermost group of an intercepted stack. The means for moving the at least one pusher can further comprise a stepping motor for the conveyor which advances the at least one pusher, and the apparatus can further comprise means for varying the level of the top portion of the second path. Such level varying means can include elevator means for the means which moves the at least one pusher, i.e., for the endless conveyor and its motor.

The apparatus preferably further comprises means for varying the width of the clearance beneath the barrier. Such varying means can include elevator means for the barrier.

Still further, the apparatus can comprise means for adjusting the barrier in and counter to the predetermined direction, i.e., for moving the barrier toward or away from the gate behind the intercepted stack. Such adjusting means can comprise an elongated carrier for the barrier and guide means defining for the carrier a third path for movement in and counter to the predetermined direction. The adjusting means can constitute the aforementioned means for varying the level of the barrier.

The apparatus can also comprise a take-off or withdrawing conveyor which is positioned downstream of the clearance to receive groups which are advanced by the at least one pusher.

The transporting means can include an endless belt or chain conveyor and a table in front of the conveyor. The barrier can be disposed above the table, i.e., downstream of the conveyor which forms part of the transporting means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

The single FIGURE of the drawing is a somewhat schematic partly elevational and partly vertical sectional view of an apparatus which is designed to singularize a series of stacks consisting of inner books and is constructed and assembled in accordance with one embodiment of the present invention.

DESCRIPTION OF PREFERRED EMBODIMENTS

The drawing shows certain component parts of an apparatus which serves to singularize successive stacks 8 of a series of stacks of superimposed groups (81, 82, 83, 84) of paper sheets or the like. Each group can constitute an inner book, a brochure, a pamphlet, a signature or an analogous accumulation of sheets. The stacks 8 are gathered at or ahead of a trimming machine 7 which preferably comprises a plurality of knives (e.g., three knives of which only one can be seen in the drawing) for simultaneously trimming several (e.g., three) sides of groups 81–84 constituting a stack 8. A suitable trimming machine is disclosed, for example, in commonly owned U.S. Pat. No. 4,202,232 granted May 13, 1980 to Hans Müller. The reason for stacking groups 81–84 ahead of or at the station for the trimming machine 7 is that the output of this machine is normally less than the output of the machine (e.g., a perfect binder, not shown) which gathers sheets into a series of groups of coherent sheets. Each stack 8 can consist of two, three, four or more superimposed groups of sheets, depending upon the height of each group, on the design of the trimming machine 7 and/or on the difference between the output of the machine 7 and the output of the group forming machine.

The improved singularizing apparatus comprises a transporting unit including an endless belt or chain conveyor 1 and a stationary table 3 the rear portion of which is overlapped by or receives the front portion of the upper reach or stretch of the conveyor 1. The direction in which the upper reach of the conveyor 1 advances successive stacks 8 of a series of such stacks is indicated by arrow 5. The reference character 4 denotes a preferably horizontal or substantially horizontal plane including the upper side of the table 3 and preferably further including or being closely adjacent the upper side of the upper reach of the conveyor 1. The conveyor 1 is trained over rotary guide elements 6 in the form of smooth-surfaced or toothed pulleys or sprocket wheels, depending on the nature of the conveyor 1. Successive discrete groups 81, 82, 83, 84 of a stack 8 above the table 3 are advanced in the direction of arrow 5 to be entrained by the upper reach of an endless take-off or withdrawing conveyor 2 serving to deliver discrete groups to a labelling, addressing, gathering or other station, not shown.

The singularizing apparatus further comprises a barrier 10 (e.g., an elongated rail) which extends transversely of the (first) path for successive stacks 8 above the plane 4 and defines with the adjacent portion of the table 3 a clearance 16 having a width which is not less than n=17 but not more (and preferably less) than 2n (wherein n=17 equals the height or thickness of a group 81, 82, 83 or 84). The barrier 10 is mounted at the rear end of an elongated carrier 11 which is parallel to the direction of transport of stacks 8 toward the barrier and is installed in a guide means or bearing 12. The carrier 11 not only supports the barrier 10 at a selected level above the plane 4 but also constitutes or forms part of a means for adjusting the barrier in and counter to the direction of arrow 5 (note the arrow 13), namely toward and away from a pivotable gate 19 in the form of a flap which is installed behind the groups 81–84 of a stack 8 abutting the barrier 10. A screw (not shown) or any other suitable fastener can be employed to releasably secure the carrier 11 to the bearing 12 when the barrier 10 is located at a selected distance from the gate 19. Such adjustability of the barrier 10 in and counter to the direction of arrow 5 enhances the versatility of the improved apparatus because the latter is capable of properly singularizing longer or shorter groups of sheets or the like.

The reference character 14 denotes a singularizing station which is located above the plane 4 (in part above the upper reach of the conveyor 1 and in part above the upper side of the table 3) and at which a stack 8 (the three uppermost groups 82-83 of which initially abut the barrier 10) is broken up into a file or row of discrete groups 81, 82, 83, 84 in such order.

The bearing or guide means 12 is movable up and down (arrow 15) to move the carrier 11 (and hence the barrier 10) to a selected level, i.e., the carrier 11 and the bearing 12 can be said to constitute an elevator for the barrier 10. Such movability of the barrier 10 in directions which are indicated by the arrow 15 renders it possible to select the width of the clearance 16, i.e., to ensure that the apparatus can properly singularize stacked groups having different heights n. The means for moving the bearing 12 up and down can include one or more cylinder and piston units, one or more rack and pinion drives or the like.

The gate 19 is pivotable about a horizontal axis extending at right angles to the direction (arrow 5) of transport of stacks 8 toward the barrier 10 and defined by one or more supports 18 which are mounted in the frame of the improved singularizing apparatus or in the frame of the trimming machine 7. The means for moving the gate 19 between the solid-line (first) position and the phantom-line (second) position includes a fluid-operated motor 20 which can pivot the gate through an angle of approximately 90 degrees. When in the solid-line position, the gate 19 prevents the delivery of a fresh stack 8 onto the table 3 and can be maintained in actual abutment with the rear edge faces of the groups 82-83 forming part of a freshly intercepted stack 8, i.e., of a stack including a lowermost group 81 resting on the upper side of the table 3 and having the underside of its lowermost sheet or panel disposed in the plane 4. It is clear that the motor 20 should not bias the groups 82-84 against the barrier 10 with a force which would prevent such groups from descending by gravity toward and onto the table 3 as soon as the lowermost group (81, 82, etc.) of the intercepted stack 8 has been advanced through and beyond the clearance 16 between the barrier 10 and the table 3. When the gate 19 is moved to the phantom-line position, it is located outside of the path of movement of stacks 8 toward the barrier 10, i.e., the conveyor 1 of the transporting unit is then free to advance a freshly trimmed stack 8 from the machine 7 toward and against the barrier 10.

Friction between the upper side of the table 3 and the underside of the lowermost group of a stack 8 which has been intercepted by the barrier 10 preferably suffices to ensure that such lowermost group (note the group 81 of the stack 8 at the singularizing station 14) does not move forwardly (arrow 5) beyond the adjacent (next-to-the-lowermost) stack unless it is positively advanced into and through the clearance 16 beneath the barrier 10. The conveyor can be driven by a continuously running motor or by another suitable prime mover, not shown.

The means for advancing successive lowermost groups 81, 82, 83, 84 of an intercepted stack 8 at the singularizing station 14 into and through the clearance 16 comprises a set of three equidistant pushers 26 attached to an endless chain or belt conveyor 24 forming part of a means for moving the pushers 26 along an endless (second) path having a top portion adjacent the upper side of the table 3. Such top portion of the second path is defined by the horizontal upper reach of the conveyor 24 which latter is trained over smooth-surfaced or toothed pulleys or sprocket wheels 23 (depending on the nature of the conveyor 24). A second portion of the second path is defined by the lower reach of the conveyor 24 at a level beneath the plane 4. The pulleys or sprocket wheels 23 for the conveyor 24 are mounted in a frame 21 which further carries a stepping motor 25 serving as a means for transmitting torque to one of the pulleys or sprocket wheels 23 by way of a belt or chain transmission (indicated by phantom lines).

The frame 21 not only serves as a support for the means (24, 25) for moving the pushers 26 along the endless second path and also forms part of an elevator which can raise or lower the conveyor 24 and the motor 25 to thus select the level of the top portion of the second path, namely of that portion along which successive pushers 26 advance in order to move the lowermost group of an intercepted stack 8 into, through and beyond the clearance 16, i.e., into the range of the take-off conveyor 2. The elevator for the conveyor 24 and its pushers 26 further comprises two bell crank levers 27 which are pivotable about the axes of fixedly mounted parallel shafts 28. One arm of each lever 27 is articulately connected to the frame 21, and the other arm of each of these levers is articulately connected to a bar 29 which can be reciprocated by the output element 31 of a motor 32. The output element 31 can constitute a rotary feed screw which extends into a tapped bore 30 of the bar 29 and can be rotated by the motor 32. It is clear that the mounting of the motor 32 on its support and/or the connection between the bar 29 and each of the levers 27 must ensure that the output element 31 remains in proper mesh with the adjacent end portion of the bar 29 when the motor 32 is operated to pivot the levers and to thereby move the frame 21 in one of the directions indicated by the arrow 22, i.e., to raise or lower the level of the top portion of the (second) path for the pushers 26. The extent to which a pusher 26 which is in the process of advancing a group along the plane 4 toward the conveyor 2 extends above the plane 4 is slightly less than the width of the clearance 16, i.e., each pusher 26 should be free to advance the lowermost group of an intercepted stack 8 through and beyond the clearance 16 before it leaves the top portion of its path to advance along the second or lower portion of such path toward the position occupied by the rightmost pusher 26, namely beneath the gate 19 and adjacent the rear edge face of the lowermost group (81) of the intercepted stack 8 at the singularizing station 14.

The mutual spacing of pushers 26 on the conveyor 24 is greater than the length of the longest group which is to be advanced beneath and beyond the barrier 10. As a rule, the elevator including the frame 21 and the parts 27-32 will maintain the top portion of the path for the pushers 26 at a level such that the pusher which is in the process of advancing a group into and beyond the clearance 16 projects above the plane 4 a distance not exceeding the thickness (n=17) of a group 81, 82, 83 or 84 and less than the width of the clearance.

The operation of the trimming machine 7 is synchronized with that of the motor for the conveyor 1 and with that of the stepping motor 25 for the conveyor 24. The synchronization is such that a freshly trimmed stack 8 which is in the process of leaving the trimming machine 7 and proceeding toward the barrier 10 advances behind one of the pushers 26 and in front of the next-following pusher 26 so that the three topmost groups 84, 83, 82 of such stack can advance toward and come to a halt when they reach the barrier 10. At such time, the motor 20 maintains the gate 19 in the second (phantom-line) position. The gate 19 is thereupon caused to assume the solid-line position (e.g., in response to a signal from a detector, not shown, which monitors the (first) path for the stacks 8 and transmits a signal when a stack reaches the barrier 10), preferably at a time when one of the pushers 26 assumes a position corresponding to that of the rightmost pusher on the conveyor 24. The stepping motor 25 causes the conveyor 24 to move such rightmost pusher 26 from the illustrated position toward, through and beyond the clearance 16 so that the lowermost group 81 of the freshly intercepted stack 8 at the station 14 is advanced toward and onto the conveyor 2. The mutual spacing between the pushers 26 suffices to ensure that the remnant of the stack 8 at the station 14 is free to descend onto the table 4 before the next-following pusher 26 reaches a position corresponding to that of the pusher beneath the gate 19. The singularization then proceeds, i.e., the groups 82, 83, 84 are transferred onto the conveyor 2 before the motor 20 pivots the gate to the phantom-line position to permit delivery of the next stack 8 of the series of stacks toward and onto the table 3. The motor 20 then returns the gate 19 to the solid-line position and the singularization of the freshly intercepted stack 8 at the station 14 proceeds in the aforedescribed manner.

The gate 19 cooperates with the barrier 10 to properly orient the groups 81–84 of a stack 8 at the station 14 while the stack is being subdivided into a row or file of four discrete groups.

If the apparatus is to be used to break up stacks consisting of longer or shorter groups, the connection between the carrier 11 and the bearing 12 is temporarily interrupted or weakened so that the barrier 10 can be adjusted by moving toward or away from the gate 19.

If the apparatus is to be used to break up stacks consisting of groups which are thicker or thinner than the illustrated groups 81–84, the elevator including the frame 21 and the parts 27–32 is operated by causing the motor 32 to pivot the levers 27 in a clockwise or counterclockwise direction so that the conveyor 24 moves in one of the directions indicated by the arrow 22, i.e., to change the level of the top portion of the path for the pushers 26. For example, each stack can consist of three superimposed groups which are thicker than the illustrated groups but the height of such stack equals or approximates the height of the illustrated stacks 8. Such shifting from singularization of stacks containing relatively thin groups to singularization of stacks containing thicker groups normally further necessitates an adjustment of the level of the barrier 10 (i.e., a widening of the clearance 16) by the elevator including the carrier 11 and the bearing 12. The operation of the motor 32 can by synchronized with that of the means for raising and lowering the bearing 12 to ensure that the extent of movement of the frame 21 to a different level is proportional to the extent of movement of the barrier 10 to a different level.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for singularizing a series of stacks of superimposed groups of sheets wherein each group has a predetermined height, comprising means for transporting successive stacks of the series above a predetermined plane in a predetermined direction along a first path; a barrier extending transversely of said path above said plane and defining with said plane a clearance having a width between n and 2n wherein n is the height of a group so that the barrier intercepts each but the lowermost group of an oncoming stack; means for advancing successive lowermost groups of a thus intercepted stack, including at least one pusher and means for moving said at least one pusher along a second path including a top portion wherein the at least one pusher extends above said plane a distance at most equaling n and advances toward said clearance from a position behind an intercepted stack, said moving means comprising an endless conveyor having an upper reach which is substantially parallel to said plane and defines the top portion of said second path, and a lower reach which defines a second portion of said second path at a level beneath said plane for advancement of said at least one pusher back to said position thereof; and means for varying the level of the top portion of said second path.

2. The apparatus of claim 1, wherein the top portion of said second path extends in said direction beyond said clearance.

3. The apparatus of claim 1, further comprising a gate extending substantially transversely of said first path and means for moving said gate between a first position in which said gate is located in said first path behind an intercepted stack and a second position outside of said first path.

4. The apparatus of claim 3, wherein said gate is pivotable between said first and second positions thereof.

5. The apparatus of claim 3, wherein said gate is located above the top portion of said second path in said first position thereof.

6. The apparatus of claim 3, wherein the means for moving said gate includes means for urging the gate against each but the lowermost group of an intercepted stack in the first position of said gate.

7. The apparatus of claim 1, wherein said moving means further comprises a stepping motor for said conveyor.

8. The apparatus of claim 1, wherein said varying means includes elevator means for said moving means.

9. The apparatus of claim 1, further comprising means for varying the width of said clearance.

10. The apparatus of claim 9, wherein said varying means includes elevator means for said barrier.

11. The apparatus of claim 1, further comprising means for adjusting said barrier in and counter to said predetermined direction.

12. The apparatus of claim 1, further comprising a conveyor positioned downstream of said clearance to receive groups which are advanced by said at least one pusher.

13. The apparatus of claim 1, wherein said transporting means comprises an endless conveyor and a table downstream of said conveyor, said barrier being disposed above said table.

14. Apparatus for singularizing a series of stacks of superimposed groups of sheets wherein each group has a predetermined height, comprising means for transporting successive stacks of the series above a predetermined plane in a predetermined direction along a first path; a barrier extending transversely of said path above said plane and defining with said plane a clearance having a width between n and 2n wherein n is the height of a group so that the barrier intercepts each but the lowermost group of an oncoming stack; means for adjusting said barrier in and counter to said predetermined direction; and means for advancing successive lowermost groups of the intercepted stack, including at least one pusher and means for moving said at least one pusher along a second path including a top portion wherein the at least one pusher extends above said plane a distance at most equaling n and advances toward said clearance from a position behind an intercepted stack.

15. The apparatus of claim 14, wherein said second path includes a second portion along which said at least one pusher advances toward said position by moving at a level beneath said plane.

16. The apparatus of claim 14, wherein said moving means comprises an endless conveyor having an upper reach which is substantially parallel to said plane and defines the top portion of said second path, and a lower reach which defines a second portion of said second path at a level beneath said plane for advancement of said at least one pusher back to said position thereof.

17. The apparatus of claim 16, further comprising means for varying the level of the top portion of said second path.

18. The apparatus of claim 11, wherein said adjusting means comprises an elongated carrier for said barrier and guide means defining for said carrier a third path for movement in and counter to said direction.

19. Apparatus for singularizing a series of stacks of superimposed groups of sheets wherein each group has a predetermined height, comprising means for transporting successive stacks of the series above a predetermined plane in a predetermined direction along a first path; a barrier extending transversely of said path above said plane and defining with said plane a clearance having a width between n and 2n wherein n is the height of a group so that the barrier intercepts each but the lowermost group of an oncoming stack; means for advancing successive lowermost groups of the thus intercepted stack, including at least one pusher and means for moving said at least one pusher along a second path including a top portion wherein the at least one pusher extends above said plane a distance at most equaling n and advances toward said clearance from a position behind an intercepted stack, said second path including a second portion along which said at least one pusher advances toward said position by moving at a level beneath said plane; a gate extending substantially transversely of said first path; and means for moving said gate between a first position in which said gate is located in said first path behind an intercepted stack and a second position outside of said first path, said means for moving said gate comprising means for urging the gate against each but the lowermost group of an intercepted stack in the first position of said gate.

* * * * *